United States Patent [19]

Pansini

[11] 4,100,641
[45] Jul. 18, 1978

[54] SWIMMING POOL CLEANERS

[76] Inventor: Andrew L. Pansini, 180 Los Cerros Dr., Greenbrae, Calif. 94904

[21] Appl. No.: 699,304

[22] Filed: Jun. 24, 1976

[51] Int. Cl.$^2$ .......................... E04H 3/20; A47L 5/00
[52] U.S. Cl. ...................................... 15/1.7; 180/1 R
[58] Field of Search ................ 15/1.7; 180/1 R, 66 R; 114/222; 134/167 C, 168 C

[56] References Cited

U.S. PATENT DOCUMENTS 3,822,754  7/1974  Henkin ................................ 15/1.7 X Primary Examiner—Edward L. Roberts

[57] ABSTRACT

A jet-powered submerged cleaner runs along the bottom of a pool and also up and down the side walls and does not require a booster pump for proper operation. It travels on idler wheels and has a jet drive system which is under the control of pressure-responsive elements. The latter so operate that when the cleaner is sufficiently impeded against further movement in a given direction the jet drive system commences driving the cleaner in another direction. The cleaner discharges water under pressure in such a way that dirt is either vacuumed or blown free from adjacent pool wall surfaces, and the pressurized water is so directed and controlled as to cause the cleaner to be pressed against adjacent pool wall surfaces to thereby enable the cleaner to travel along and to climb inclined and vertical pool surfaces. A swivel connection is utilized to rotatably relate a pair of concentric tubes to minimize friction forces and enable foolproof operation of those embodiments of the cleaner which employ such concentric tubes.

20 Claims, 26 Drawing Figures

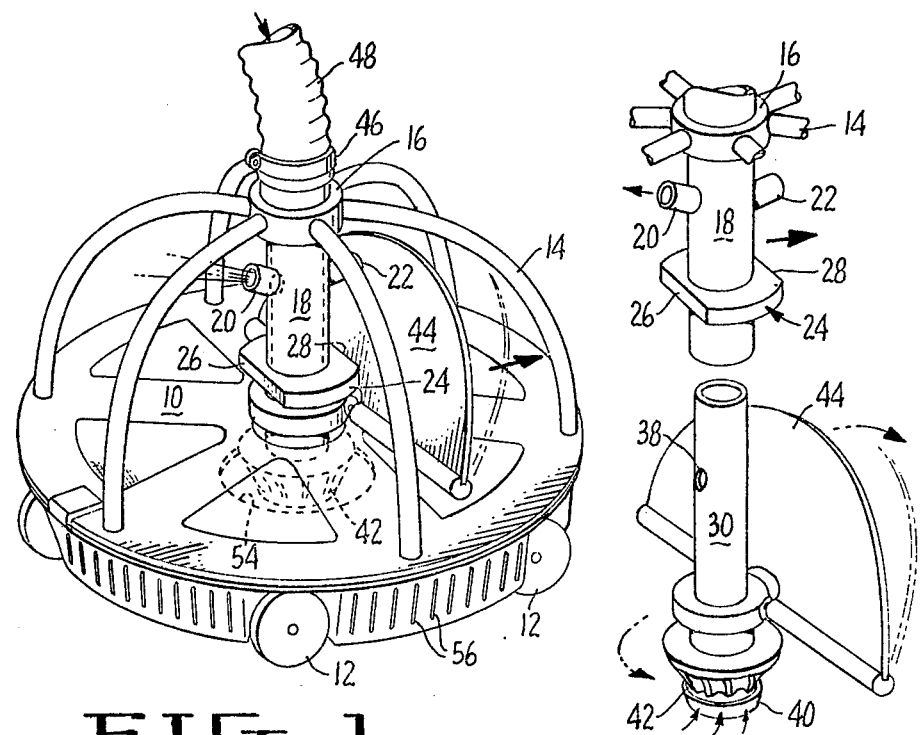
FIG. 1.
FIG. 2.
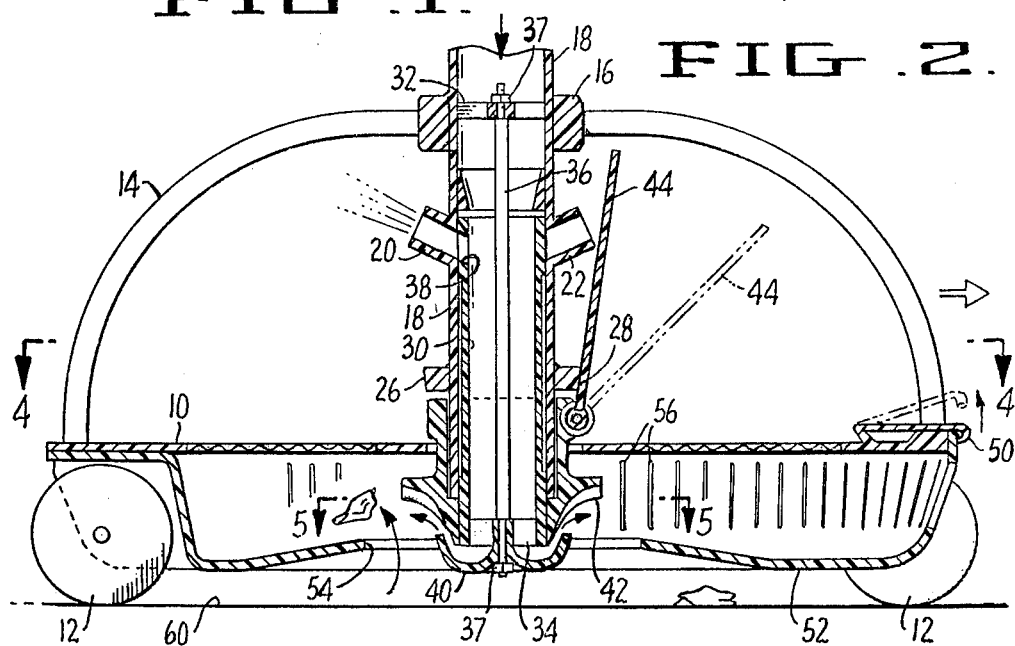
FIG. 3.

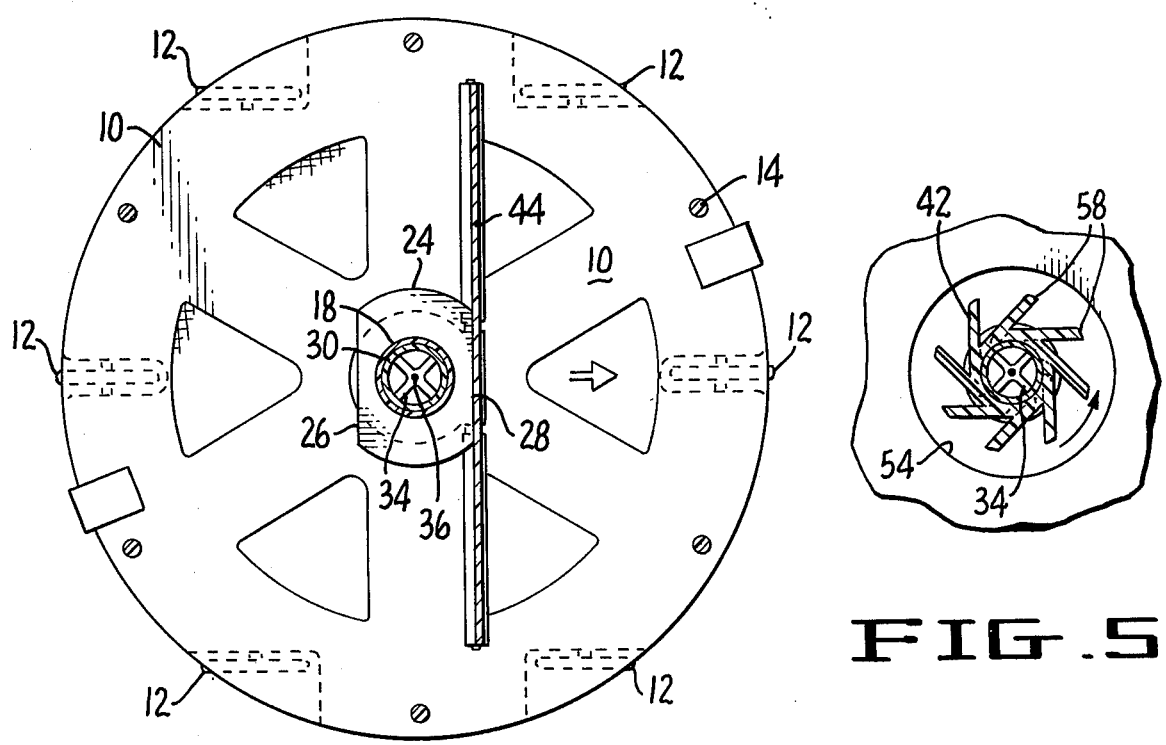
FIG. 4.
FIG. 5.
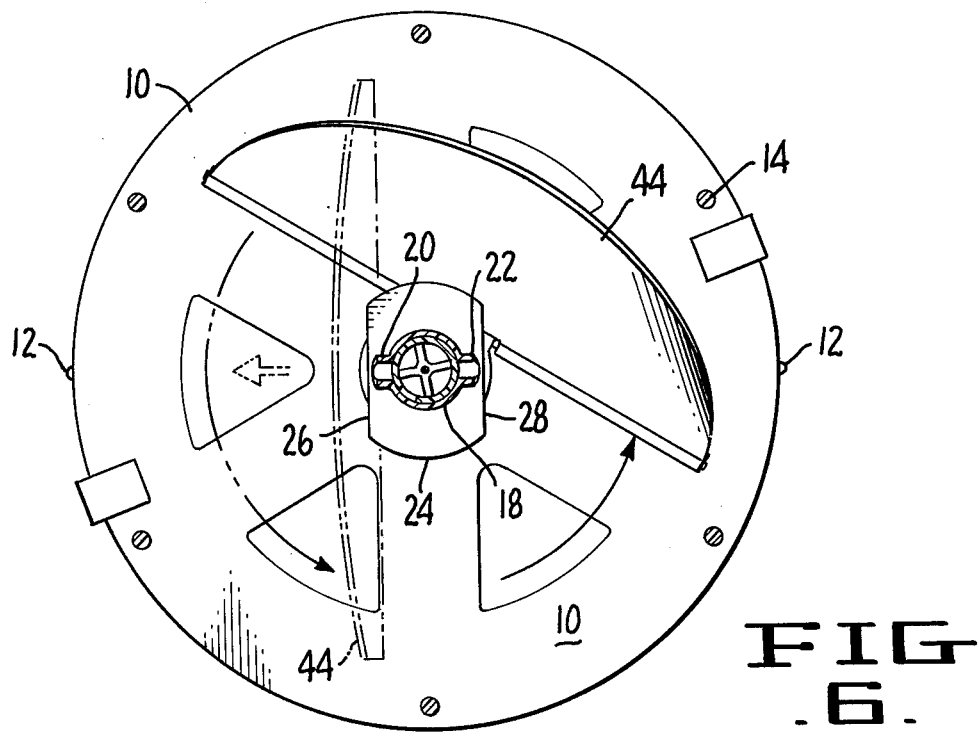
FIG. 6.

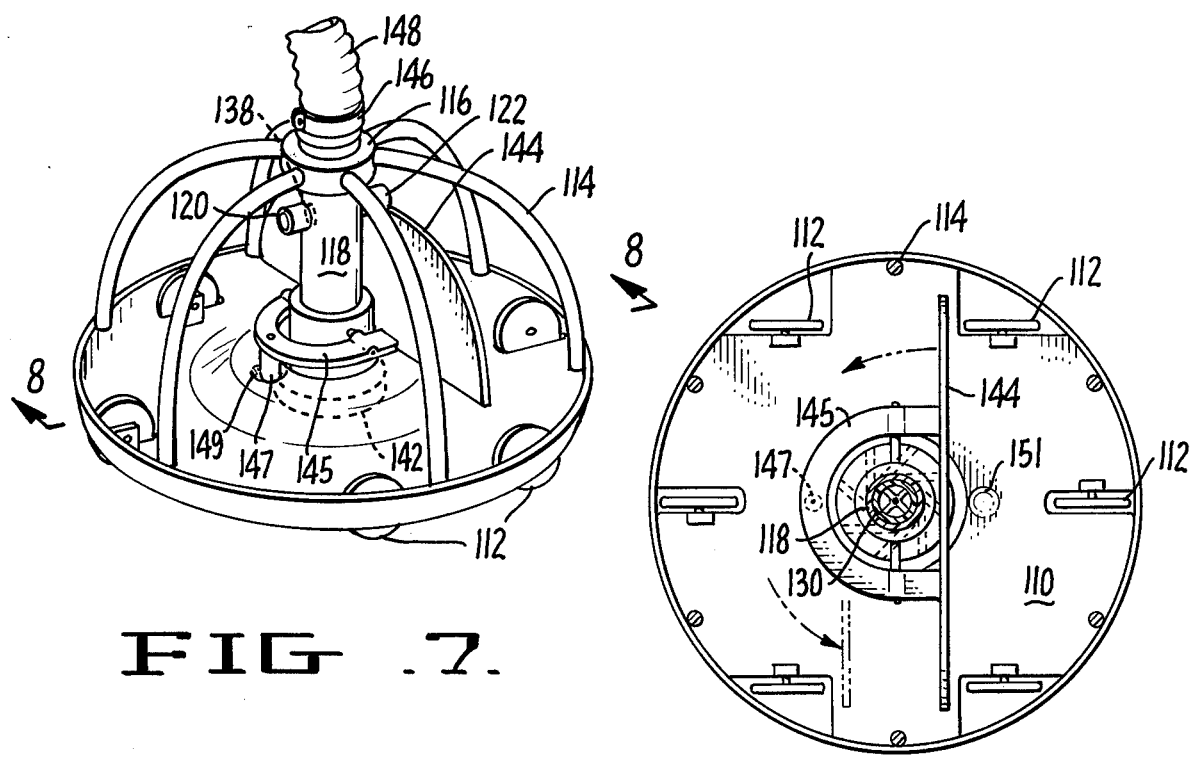
FIG. 7.
FIG. 9.
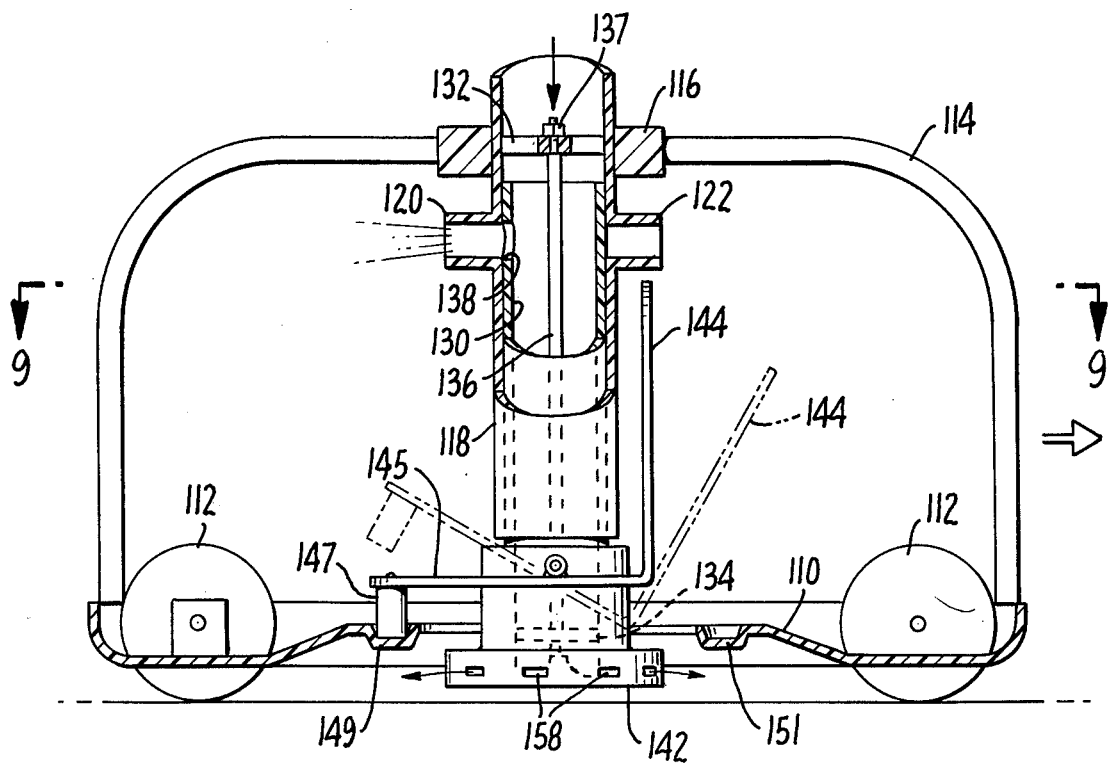
FIG. 8.

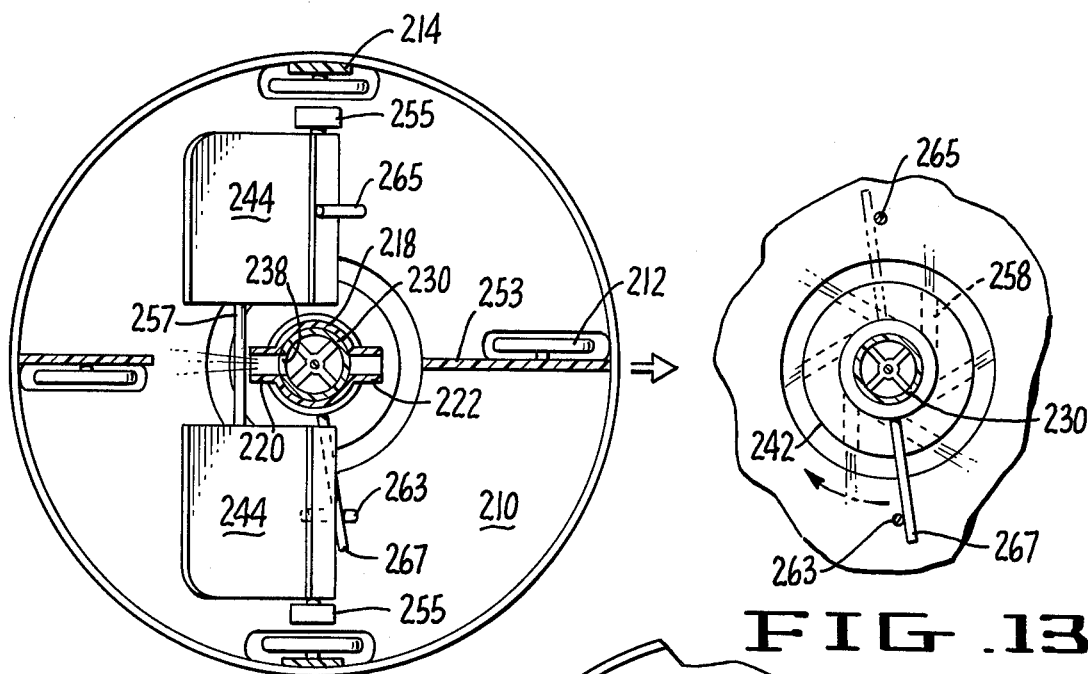
FIG. 12.
FIG. 13.
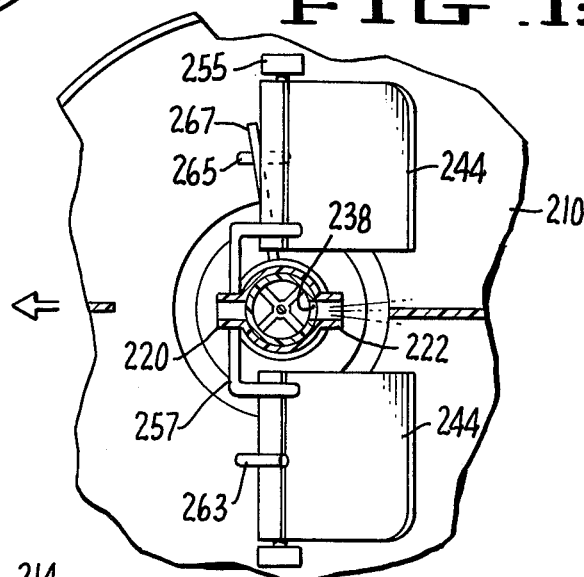
FIG. 14.
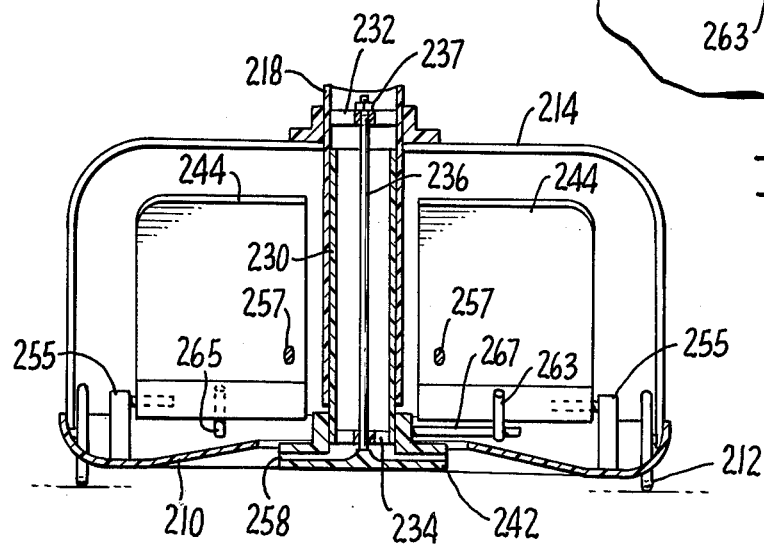
FIG. 15.

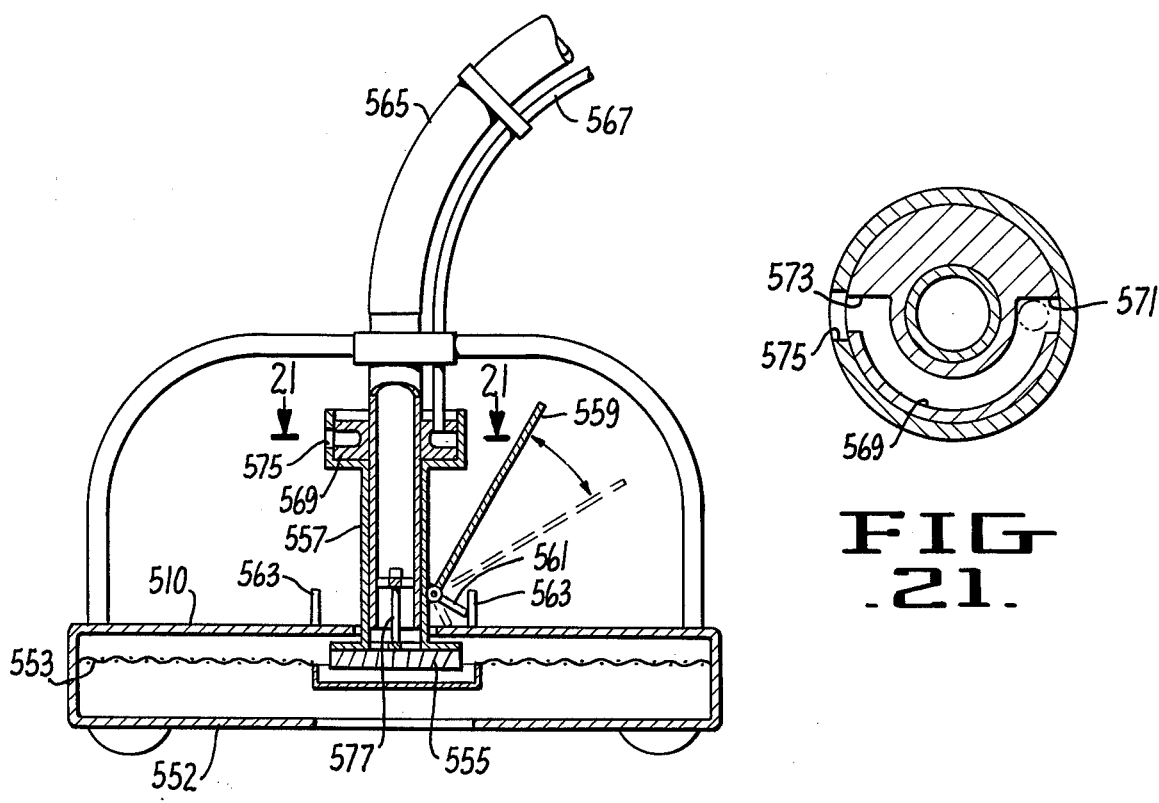
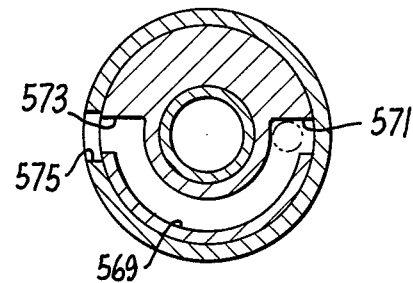
FIG. 20.
FIG. 21.
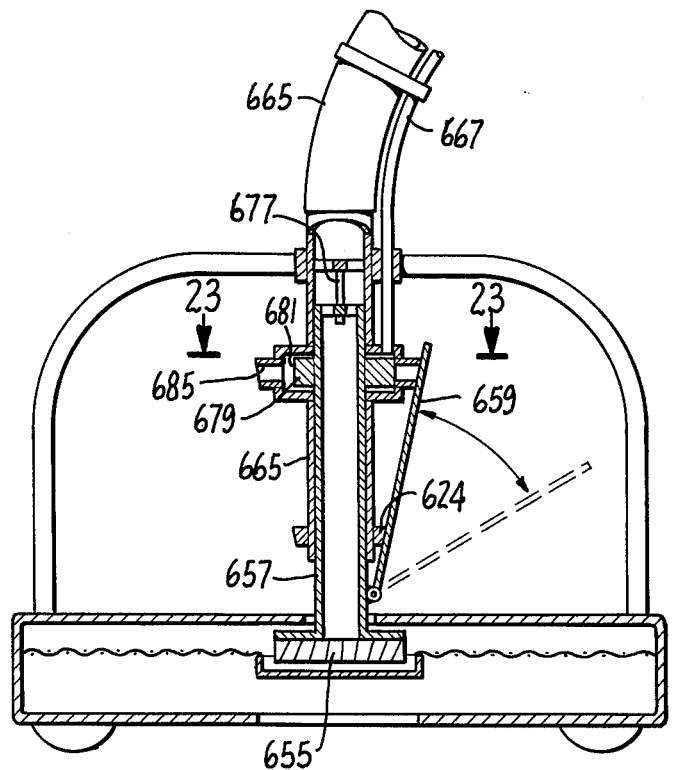
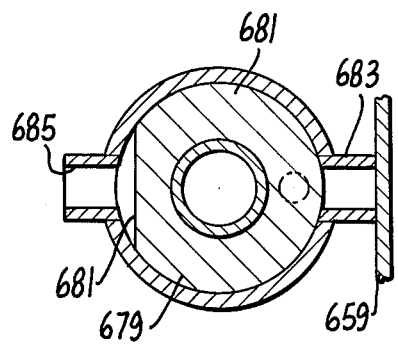
FIG. 22.
FIG. 23.

SWIMMING POOL CLEANERS

SUMMARY OF THE INVENTION

Cleaners embodying the present invention travel in a submerged condition along non-repetitive paths until in a given period of time they travel over the entirety of the submerged side wall and floor surfaces of the pool. They differ from the previously known cleaners of this type shown in U.S. Pat. Nos. 3,229,315 and 3,822,754 in that they do not have power driven wheels and instead have selectively operable oppositely directed drive jets which are turned on and off depending upon the ambient pressure forces applied to blade control elements as the cleaner moves through the water. The cleaner may utilize a flow of water issuing from it to cause the cleaner to be pressed against the pool wall surface as well as to rotate a control element to reverse the direction of jet drive when rotation of the control element is permitted by a decrease in the ambient pressure applied to a blade unit carried by the control element. The cleaner may also utilize a flow of water issuing from it to cause it to be pressed against the pool wall surface while employing other means, such as a separate flow of water issuing from a rotatable nozzle, to reverse the direction of jet drive when the ambient pressure permits such reversal.

An object of the invention is to provide a wheel-supported underwater automatic pool cleaner in which the wheels are not employed as traction means but are instead used as means to decrease the friction between the physical pool surfaces and the cleaner.

A further object of the invention is to provide a wheel-supported underwater automatic pool cleaner which is able to continuously move back and forth along varying paths to accomplish full pool cleaning coverage.

Still a further object of the invention is to provide an automatic pool cleaner of the underwater water-powered type as to which water from the pressure side of the pool's filter system is fed back into the pool through the cleaner and there is no need to employ a booster pump for proper operation of the cleaner.

Another object of the invention is to provide a pool cleaner of the type described in which the pressurized water delivered to the cleaner is divided into two parts, one part issuing through a jet nozzle disposed above the vehicle part of the cleaner to drive the cleaner and the other part issuing from the cleaner at the underside thereof to induce a suction force to both press the cleaner against the pool wall surface and induce leaves and other debris to be drawn into a collecting chamber provided in the cleaner.

Other objects and advantages of the invention will be apparent from the following description taken in conjunction with the drawings forming part of this specification, and in which:

FIG. 1 is a view in perspective of one embodiment of the cleaner of the invention;

FIG. 2 is a detail view in perspective of the drive system of the FIG. 1 cleaner and the control means for the drive system;

FIG. 3 is an enlarged view in section taken along a vertical diametral plane of the FIG. 1 cleaner;

FIG. 4 is a detail view taken along lines 4—4 of FIG. 3;

FIG. 5 is a detail view taken along lines 5—5 of FIG. 3;

FIG. 6 is a view like FIG. 4 but showing the pressureresponsive control blade in a solid line condition of operation and in a dotted line condition of operation;

FIG. 7 is a view in perspective of another embodiment of the cleaner of the invention;

FIG. 8 is an enlarged view taken along lines 8—8 of FIG. 7;

FIG. 9 is a view reduced in size taken along lines 9—9 of FIG. 8;

FIG. 12 is a view reduced in size taken along lines 12—12 of FIG. 11;

FIG. 13 is a view reduced in size taken along lines 13—13 of FIG. 11;

FIG. 14 is a view like FIG. 12 but showing the direction of movement of the cleaner as being to the left rather than to the right;

FIG. 15 is a view reduced in size taken along lines 15—15 of FIG. 11;

FIG. 20 is a view of another embodiment of the invention;

FIG. 21 is a view taken along lines 21—21 of FIG. 20;

FIG. 22 is a view of another embodiment of the invention

FIG. 23 is a view taken along lines 23—23 of FIG. 22;

Figure 10:
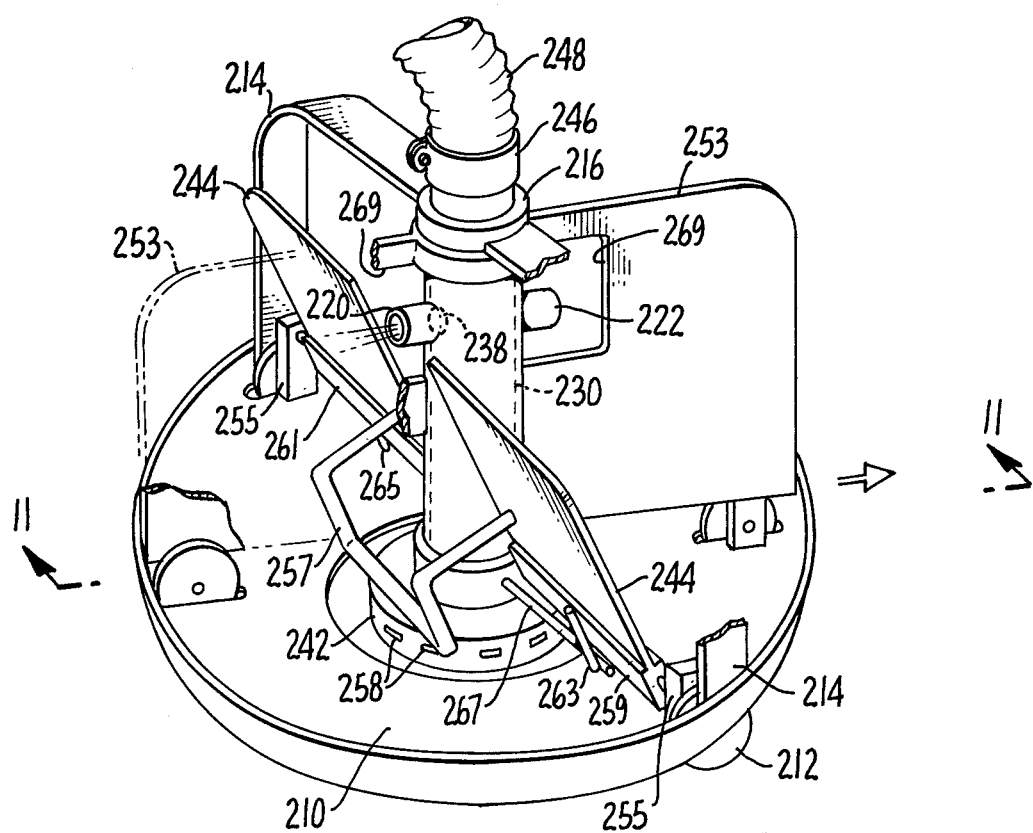
FIG. 10 is a view in perspective of a further embodiment of the cleaner of the invention.

Referring first to FIGS. 1–6 of a preferred embodiment of the invention, the cleaner comprises a plate or platform member 10 supported by wheels 12 and in turn supporting bar members 14, collar 16 and fixed tube 18. Tube 18 is provided with oppositely and somewhat upwardly directed jet nozzle tubes 20 and 22. Fixedly attached to tube 18 is a ring member 24 having opposed flat surfaces 26 and 28. An inner tube 30 is rotatably supported within the fixed tube 18 by a novel swivel interconnection comprising cruciform-shaped web 32 fixedly attached to tube 18, cruciform-shaped web 34 fixedly attached to the inner tube 30 at the lower end thereof, a hanger rod 36, and lock nuts 37 attached to the ends of rod 36 and loosely connecting the rod 36 to each of the webs 32 and 34. The tube 30 is provided with a port 38 which is selectively registrable with the inner ends of each of the jet nozzle tubes 20 and 22.

Fixedly attached to the inner tube 30 is a water flow reversing member 40, a reaction impeller 42, and a pivotally supported pressure responsive blade element 44.

Attached to the upper end of the fixed tube 18, as by a clamping ring 46 is a flexible, floatable hose 48 which extends up to the surface, floats on the surface, and is capable of receiving the entire pressurized water output of the pool's filter system. Although not shown in the drawings, hose 48 is made up of a plurality of swivel-connected sections, the swivel connections being similar to the swivel connection system 32, 34, 36, 37. Removably attached, as by means including a catch 50, to the underside of the plate 10 is a tray member 52 defining with the plate 10 is a tray member 52 defining with the plate 10 a filtration compartment or receptacle for leaves and debris, the underside of the tray 52 being provided with a central inlet flow aperture 54. The plate 10 and the side wall of the tray 52 are provided with water flow passageways 56.

The operation of the embodiment of FIGS. 1–6 is as follows. As shown in FIG. 3, the left hand jet nozzle 20 is in operation and the cleaner is moving to the right. Part of the water coming down the tube 18 passes out the drive nozzle 20 and the rest of the water flows out the lower end of the tube 30, is reversed in direction by deflector members 40, traverses spiral grooves 58 (see FIG. 5) of the impeller 42, thereby tending to turn the impeller 42 in a counter-clockwise direction (FIG. 5), and issues substantially horizontally into the leaf compartment defined by plate 10 and tray 52. This flow in turn induces a horizontal suction flow of water beneath the cleaner which creates a low pressure area beneath the cleaner, thereby serving to press the cleaner against the pool wall surface 60. The suction flow beneath the cleaner also removes fine dirt from the pool wall surface and causes the leaves and other larger debris to move into the storage compartment above the tray 52.

As the cleaner moves with normal speed to the right (FIG. 3) the ambient water pressure applied to blade element 44 presses the blade against the flat surface 28 of ring member 24, thereby locking the impeller and tube 30 against rotation. When the cleaner slows down or stops, the impeller begins to rotate, causing the blade element 44 to move away from ring member 24 to the dotted line position where it is free of the blocking ring 24. The impeller 42 continues to rotate in a counter-clockwise direction until the blade element 44 has rotated through 180° (see FIG. 6). This aligns the jet orifice 38 with the jet nozzle 22 and causes the cleaner to be driven to the left (FIG. 3), thereby causing the ambient water pressure to press the blade element 44 against the flat surface 26 of ring member 24 and lock the impeller and the inner tube against further rotation. The cleaner proceeds in the particular direction in which it is going until it again comes to a stop or slows appreciably. The consequent reversal of the jet drive then drives the cleaner off in the generally opposite direction. The cleaner is prevented from moving back and forth along the identical path by a large number of variable resistance forces which the cleaner encounters, as for example the slope and shape of the pool wall surface it is travelling along, the resistance under certain conditions and in certain positions of the flexible inlet hose 48, etc. Due to such variant forces the cleaner is able to traverse the entirety of the submerged pool wall surfaces, including the side walls of the pool up to the water line.

The force holding the cleaner against the pool floor or side wall of the pool as a result of the suction flow beneath the cleaner induced by the water flow from the impeller 42 enables the cleaner to climb the side walls of the pool. When it does so and the blade element 44 reaches the surface of the pool water the resistance to rotative movement of the impeller 42 and the inner tube 30 is decreased to the point where these elements rotate to reverse the jet nozzle drive system. The described hold-down force is augmented by the angular disposition of the jet nozzles 20 and 22, i.e. each of the drive jets furnishes an additional component of hold-down force to the cleaner.

The embodiment of the invention shown in FIGS. 7–9 is somewhat simpler than the FIG. 1–6 embodiment. Parts essentially corresponding to those described for the FIG. 1–6 embodiment are identified by corresponding reference numerals plus 100. The plate or platform 110 is provided with wheels 112, bars 114, collar 116, fixed tube 118 having opposed jet nozzles 120 and 122 extending normal thereto, inner tube 130 having swivel support mounting system 132, 134, 136 and 137 and provided with jet nozzle outlet port 138, an outlet impeller 142 secured to the inner tube 130 and having non-radial outlet passageways 158 adapted to rotate the impeller and the inner tube in a counterclockwise direction (FIG. 9), blade element 144 having a yoke attachment 145 which is pivotally connected to the inner tube 130, and a stop member 147 carried by the yoke 145 and adapted to be alternatively received within sockets 149 and 151 formed in plate 110.

The FIG. 7–9 embodiment operates as follows. In FIG. 8 the cleaner is moving to the right. The ambient water pressure is holding the blade element 144 in the upright solid line position, thereby pressing the locking or detent element 147 into socket 149 and preventing rotation of impeller 142 and inner tube 130. The water issuing from the impeller outlets 158 flushes the dirt off of the adjacent pool wall surface over a substantial circular area, and this high velocity outlet water also sets up a low pressure condition beneath the cleaner which results in a strong hydraulic hold-down force being applied to the cleaner, enabling it to climb the pool side walls as previously described. When the cleaner slows sufficiently or stops, the ambient pressure against blade element 144 is substantially decreased, enabling the blade element 144 to move to the dotted line position of FIG. 8 to thereby move the detent 147 out of socket 149. The impeller 142 and inner tube 130 consequently rotate through 180° and as the port 138 gets into registry with the jet drive nozzle 122 the cleaner moves forwardly in the opposite direction and the ambient pressure moves the blade element 144 to an upright position to lock detent 147 in socket 151.

The embodiment of FIGS. 10–15 is quite similar to that of FIGS. 7–9, differing therefrom in the specific details of the blade element restraint system for the impeller 242 and the inner tube 230 and in the provision of a fixed stabilizer fin 253 disposed in the plane of the normal direction of travel of the cleaner. Parts corresponding to those of FIG. 1–6 are identified by the same reference numerals plus 200.

In the FIG. 10–15 embodiment there are two blade elements 244. They do not rotate about the central tubes as in the previously described embodiments, but instead flop or pivot back and forth. The blade elements are pivotally attached to posts 255 carried by the plate or platform 210 and are interconnected by a yoke member 257. The stabilizer fin is provided with a suitable relief slot, not shown, to accommodate the yoke 257 as the blade elements 244 move between the solid line and dotted line extremes of FIG. 11. The blade elements are attached to bar elements 259 and 261. Attached to one side of bar element 259 is a stop rod 263 (FIG. 11) and attached to the opposite side of the bar element 261 for the other blade element is another and similar stop rod element 265. Connected to the impeller and inner tube assembly is a radially extending rod 267.

Figure 11:
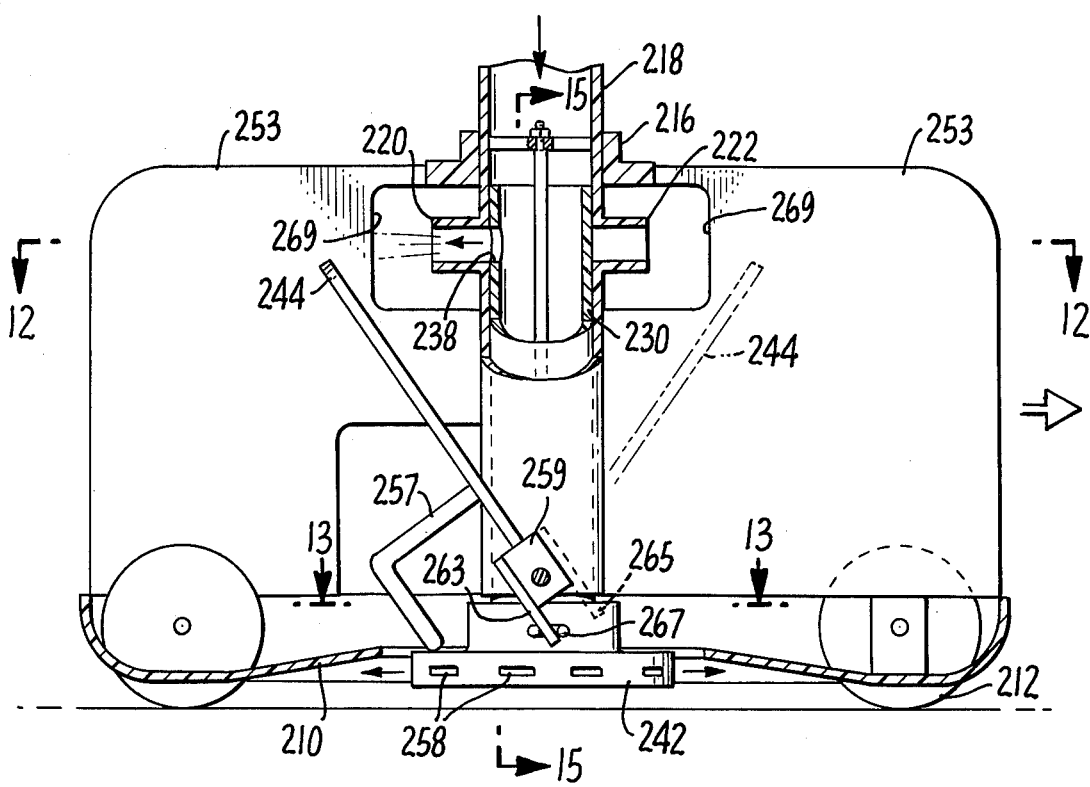
FIG. 11 is an enlarged view taken along lines 11—11 of FIG. 10.

The operation of the FIG. 10–15 embodiment is as follows. In FIG. 11 the cleaner is in normal movement to the right. Both blade elements 244 are in the solid line position, being supported in that position by engagement between the yoke 257 and the impeller 242. The water issuing from impeller 242 tends to rotate the impeller in a clockwise direction (FIG. 13), but the stop rod 263 is disposed in blocking relation to the radial rod 267, the ambient water pressure exerted against the two blade elements 244 being sufficient to keep the stop rod 263 in its blocking position. When the cleaner slows or stops, the drop in the ambient water pressure acting on the blade elements 244 decreases to the point where the rotative force applied to stop rod 263 by rod 267 swings the blade elements to the dotted line position of FIG. 11, enabling rod 267 to move past rod 263 but placing rod 265 in blocking relation to the rod 267, the latter condition being maintained by the ambient water pressure being applied to the blade elements in their new position by consequent movement of the cleaner toward the left, with reference to FIG. 11. The yoke 257 engages tube 218 to prevent the blade elements from moving further to the right past the dotted line position of FIG. 11.

The stabilizer fin 253 is provided with openings 269 to accommodate the drive jet nozzles. The water jet issuing from the active drive jet nozzle is divided by the stabilizer fin so as to pass half to one side of the fin and half to the other. The combination of the ambient water pressure and the division of the water jet driving the cleaner together make for an effective stabilizer force tending to cause the cleaner to move back and forth in the plane of the stabilizer fin 253. Other forces acting on the cleaner, such as its movement over curved or slanted surfaces, as well as the somewhat restrictive tethering force applied to the cleaner by the floatable hose 248, cause the cleaner to deviate from merely a back and forth movement along the same path so that over a period of a few hours the entirety of the pool floor and side wall surfaces is traversed and cleaned by the cleaner.

Figure 17:
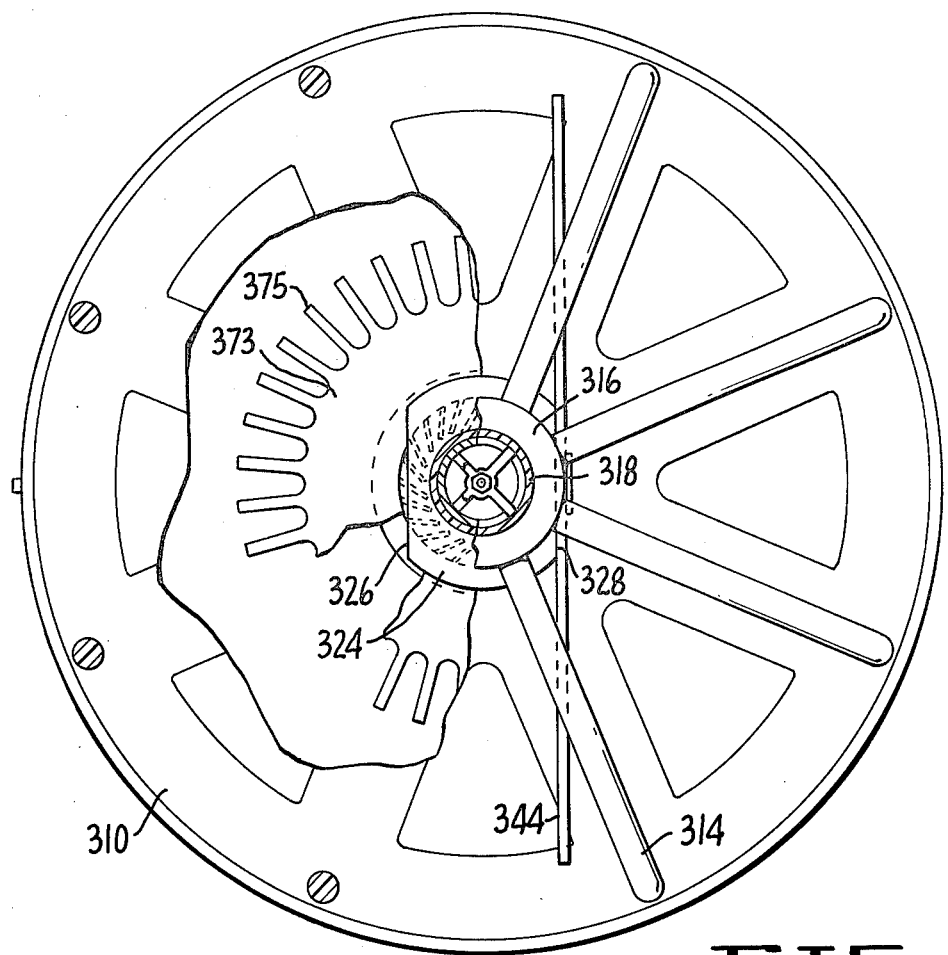
FIG. 17 is a view taken along lines 17—17 of FIG. 16.
Figure 16:
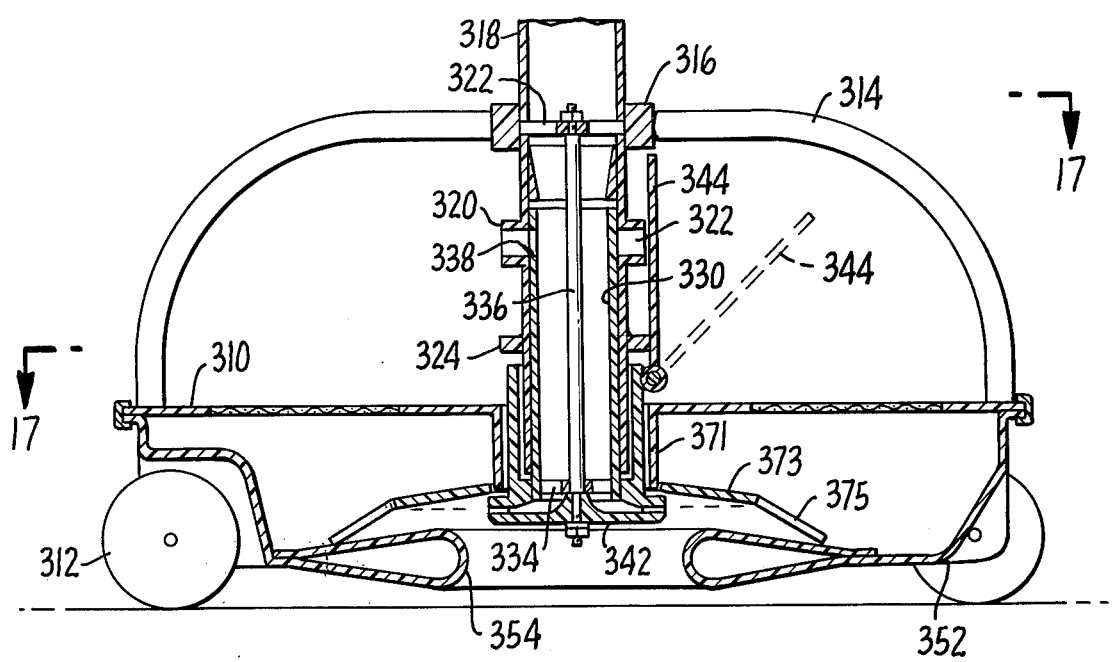
FIG. 16 is a view in diametral section of a further embodiment of the invention.

The FIG. 16–17 embodiment is quite similar to the FIG. 1–6 embodiment. Corresponding parts are identified by corresponding reference numerals plus 300.

The FIG. 16–17 embodiment differs from the FIG. 1–6 embodiment in that the total water in the inner tube 330 issues horizontally therefrom, i.e. both from the immediately active drive nozzle 320 or 322 and from the impeller 342. The water issuing from tube 330 therefore does not exert a downward thrust on the cleaner. Also, the plate 310 is provided with a central hub 371 which serves to center a free floating disc 373. The disc is provided with a slotted or combed edge 375. The disc 373 prevents the suction jets of the impeller 342 from drawing water downwardly within the leaf and debris storage compartment, thus increasing the suction lift applied beneath the cleaner by the impeller jets. The combed edge serves to prevent leaves within the storage compartment from being lost from this compartment in the midst of removing the cleaner from the pool to empty the leaf tray. The cleaner otherwise operates the same as that of FIGS. 1–6.

It will be appreciated that a swivel system corresponding to the swivel system 32, 34, 36, 37 is employed in all of the above-described embodiments of the invention. This swivel system plays an important part when the form of the subject invention includes inner and outer concentric tubes 18 and 30 which rotate relative to each other. The swivel system minimizes frictional resistance to such relative rotative movement. There is little or no frictional engagement between the outer surface of inner tube 30 and the inner surface of the outer tube 18 due to the undersized outer diameter of tube 30. To insure that dirt particles in the inlet water, which is at a pressure of about 20–30 psi guage, from the pressure side of the pool filter system does not enter into the clearance space between the two tubes, a tapered ring 37 (FIG. 3) is secured within the tube 18, as well as in all of the embodiments shown in the drawings, to direct the inlet flow into the interior of the inner tube 30. Substantially the only frictional drag between the two tubes 18 and 30, that is, resistance to rotative movement of the inner tube 30 within the outer tube 18 takes place at the loose connection joint between the rod 36 and the web 32. The consequent frictional drag is immaterial insofar as constituting an obstacle to turning movement of the inner tube.

It will also be appreciated that the supply hose is towed or pulled by the wheeled carrier or transporter, and that thus the supply hose tends to tip the transporter over in the various embodiments described. The drive jets from the nozzles 20–22, 120–122, 220–222, 320–322, being located above the center of gravity of the transporter and tending to tip the transporter in the opposite direction, offset the tipping force applied by the supply hose.

It will be appreciated that the drive nozzle means for the carrier may be single and rotatable rather than double and alternately off and on. For example, a rotatable tube on the carrier could carry the blade element, the blade element-turning impeller and a single drive nozzle. When the carrier slowed or stopped, the impeller would rotate the rotatable tube while the nozzle continued to issue its drive jet. However the jet would not become drivingly effective until it becomes turned sufficiently to drive the carrier off in another direction on the carrier wheels.

Figure 19:
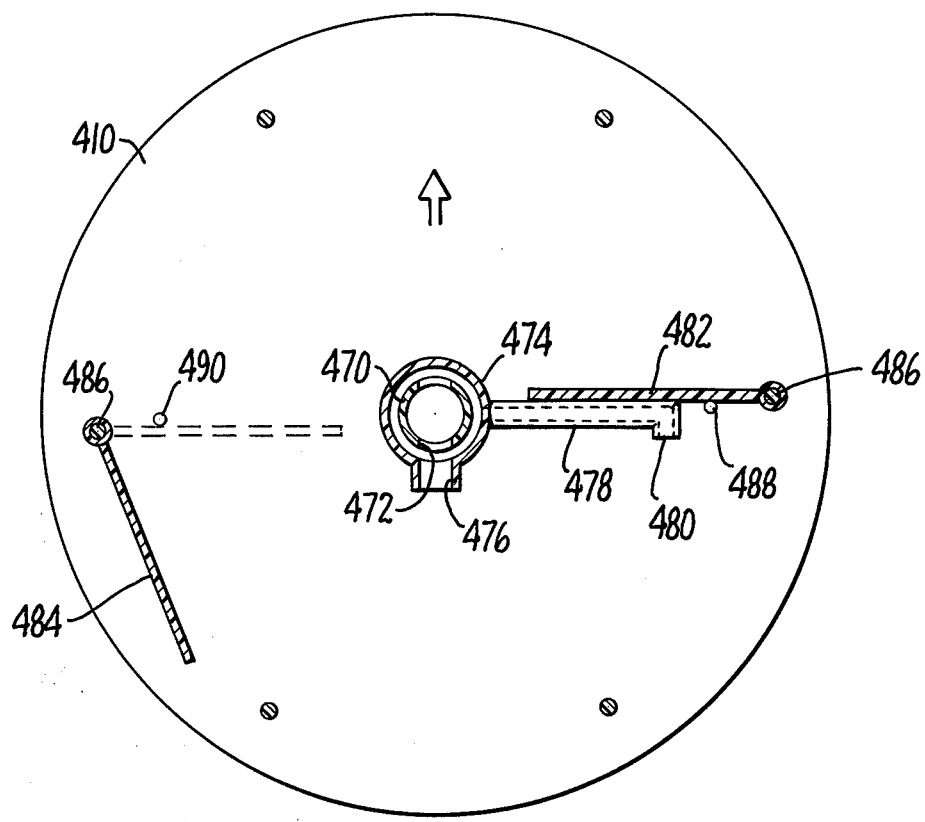
FIG. 19 is a view taken along lines 19—19 of FIG. 18.
Figure 18:
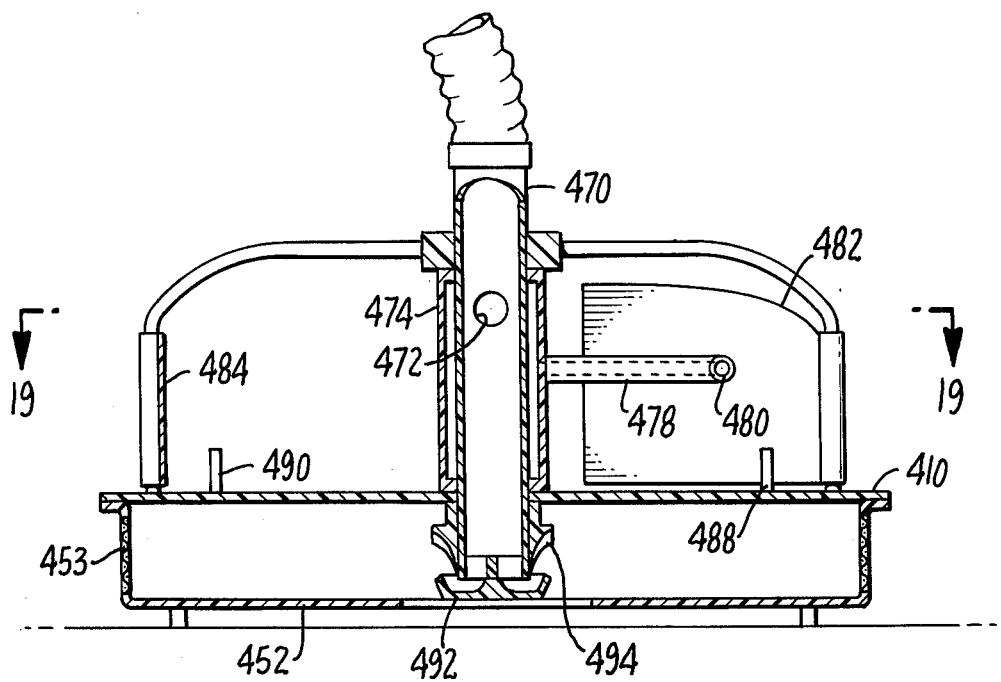
FIG. 18 is a view of another embodiment of the invention.

The FIG. 18–19 cleaner embodiment comprises a wheeled carrier comprising plate 410, leaf compartment lower wall 452, perforate leaf compartment side wall 453, a single fixed water supply tube 470 having a pair of opposed ports 472, a sleeve 474 supported for rotation on tube 470, a port 476 in the sleeve 474 selectively registrable with the ports 472, a water conduit arm 478 carried by sleeve 474 and terminating in a jet nozzle 480 which is disposed at a right angle, or substantially so, to arm 478, blade elements 482 and 484 pivotally attached to supports 486, blade stop members 488 and 490, a water-reversing deflector 492 attached to the lower end of tube 470, and annular deflector 494.

The FIG. 18–19 embodiment operates as follows. As shown in FIG. 18, the cleaner would be travelling at a right angle to the paper and away from the viewer under the influence of jet 472, 476 and the jet from nozzle 480. The ambient water pressure forces the blade 482 against its associated blade stop 488. The other blade 484 assumes a neutral trailing position as shown in FIG. 19. The cleaner travels essentially straight ahead (FIG. 19), the blade 482 tending to cause it to veer to the right but the combined jet action of the two jets serving to offset that tendency. When the cleaner slows or stops, the arm 478 rotates under the influence of the jet from nozzle 480, swinging the blade 482 to the dotted line position in FIG. 19. Rotation of the arm 478 to an amount approaching 180° aligns the sleeve port 476 with the other jet port in tube 470, whereupon the cleaner starts to move in a reverse direction and the ambient water pressure forces the blade 484 to the dotted line position in FIG. 19 where it bears against its associated stop member 490 to block further rotative movement for the time being of arm 478. Meanwhile, beneath the plate 410 the operation remains simple and unchanging, i.e. the balance of the water in tube 470 issues from the lower end of tube 470, is directed upwardly by the deflector member 490, and is directed horizontally into the leaf compartment by the deflector 494. This flow of water from tube 470 into the leaf compartment induces a suction flow of water along the pool wall surface beneath the cleaner, with the result that leaves and other debris are carried into the leaf compartment and the cleaner is pressed against the pool wall surface.

The FIG. 20-21 cleaner embodiment comprises a wheeled carrier comprising plate 510, leaf compartment lower wall 552, perforate leaf compartment upper wall 553, an impeller 555 fixedly attached to a rotatable tube 557, a blade 559 carried by and pivotally connected to the rotatable tube 557, a flange 561 on the blade 559, stop elements 563 to be engaged by the flange 561 and lock the tube 557 against rotation during normal movement of the cleaner, a suction tube 565, a pressure tube 567, a fixed manifold 569 having opposed jet openings 571, 573, an aperture 575 formed in the upper enlarged part of tube 557 and adapted to be selectively aligned with the jets 571, 573, and a swivel connection 577 of the type previously described interconnecting the suction tube 565 with the impeller portion 555 of tube 557 for the rotational support of the latter.

The operation of the FIG. 20-21 embodiment is as follows. Pressurized water passes through the tubes 567 to the manifold 569 and out of the jet opening 571, 573 which is aligned with the orifice 575. In FIG. 20, the cleaner is proceeding toward the right and the ambient water pressure forces the blade flange 561 against the right hand stop 563 to prevent rotation of the tube 557. Pressure tube 567 may be connected to the outlet of a filter pump while suction tube 565 may be connected to the inlet side thereof. Water flows up through the central opening in the leaf compartment lower wall 552, through the impeller 555 tending to rotate the same, and into the suction tube. When the cleaner slows down in its movement to the right, the tube 557 is rotated under the action of water flowing through the impeller 555 into the suction tube 565 and the blade is rotated around into association with the left hand stop 563, whereupon the tube aperture 575 becomes aligned with the jet 571 and the cleaner commences movement to the left.

The FIG. 22-23 embodiment, like the preceding one, uses a suction tube to turn the jet-controlling blade. It comprises a suction tube 665, a pressure tube 667, an impeller 655 fixedly attached to a tube 657 which is carried for rotation within the lower end of the tube 665 by the above-described swivel connection 677, a disc 679 fixedly attached to tube 657 and having a flat 681 enabling the selective connection of the jets 683, 685 to the pressure tube 667, a blade 659 carried by and having a pivotal connection with the tube 657, and a ring member 624 carried by tube 665 and adapted, like the ring member 24 of FIG. 1, to control the position of blade 659.

The operation of the FIG. 22-23 embodiment is as follows. The cleaner is moving to the right in FIG. 22, the flat 681 being disposed adjacent the left jet 685. As the cleaner slows down, suction-induced flow through the impeller 655 rotates the tube 657 to render jet 685 inoperative and jet 681 operative.

It will be appreciated that the embodiments of FIGS. 20-23 are well adapted for use in pools which do not have main drains. The pressurized water for the pressure tube 667 can either be obtained from a booster pump in the pool filter system or merely by tapping into the pool filter system at the discharge side of the filter pump.

Figure 24:
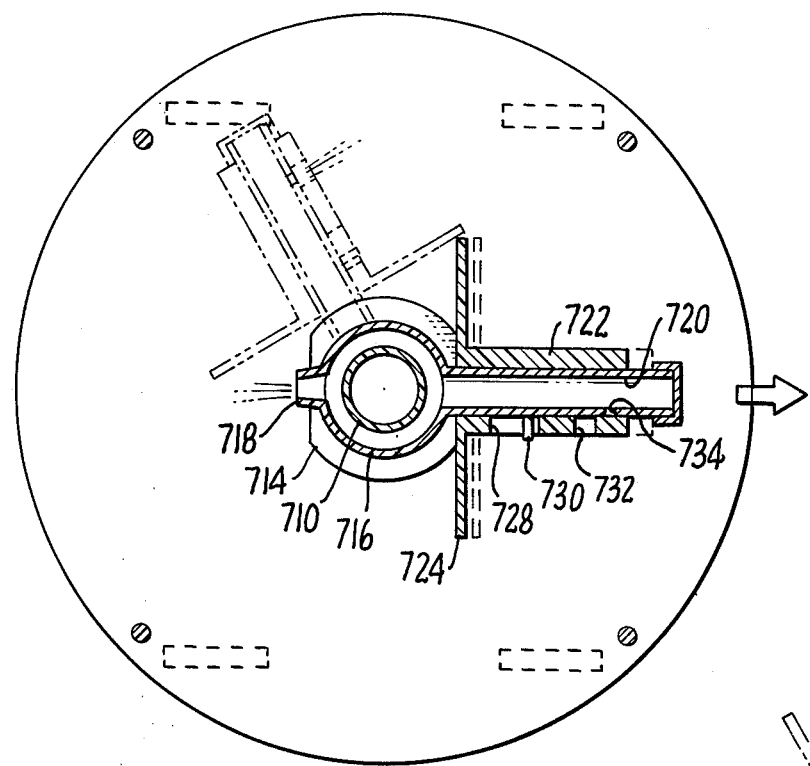
FIG. 24 is a view taken along lines 24—24 of FIG. 25 of another embodiment of the invention.
Figure 26:
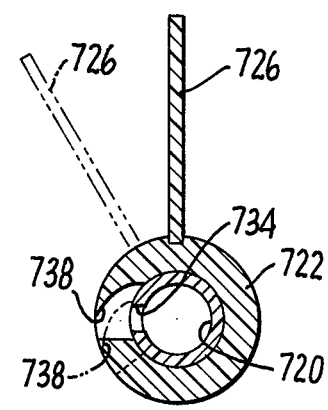
FIG. 26 is an enlarged detail view taken along lines 26—26 of FIG. 25.
Figure 25:
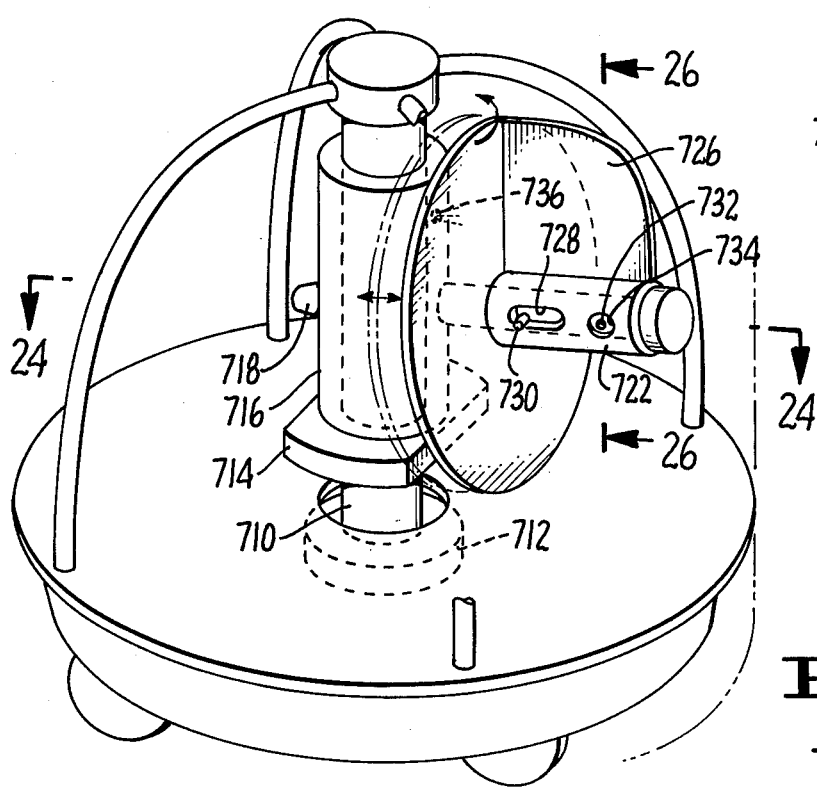
FIG. 25 is a view in perspective of the cleaner of FIG. 24.

The FIG. 24-26 embodiment comprises a fixed central tube 710, to the upper end of which the water supply hose, not shown, is attached, having a water deflector 712 at the lower end thereof. Attached to tube 710 is a cam ring 714. Sleeve 716 carrying a jet outlet 718 and arm 720 is mounted for rotation about tube 710. A sleeve 722 is slidably mounted on arm 720 and the sleeve carries an annular disc 724. The sleeve 722 is provided with a vertical fin 726. The sleeve is also provided with a relief slot 728 for a pin 730 carried by arm 720. The sleeve is also provided with an aperture 734 through which a rotation drive jet 732 for the arm 720 may operate.

The operation of the FIGS. 24-26 embodiment is as follows. The cleaner is set up to move to the right in FIG. 24. Water from within the fixed tube 710 flows into the space between said tube and sleeve 716 through port means, not shown, and the drive jet issuing from jet nozzle 718 moves the cleaner to the right. Ambient water pressure forces the disc 724 against the adjacent flat of the cam ring 714. Jet 732 is closed by the overlying sleeve 722, and consequently no turning force is being applied to the flow direction control sleeve 716. Sleeve 716 is provided with a jet opening 736 through which there issues a jet tending to push the disc 724 to the right. Instead of the jet 736, a spring could be provided to urge the disc 724 to the right. As the cleaner slows or stops, the jet 736 drives the disc to the right to thereby open the rotation jet 732 and drive the arm 720 and the attached sleeve 716 in a counter-clockwise direction (FIG. 24) until the disc comes into parallelism with the left hand flat of cam ring 714, whereupon the nozzle 718 is lined up with the plane of rotation of the wheels and the cleaner commences movement toward the left, the ambient pressure forcing the disc against the cam ring flat to close off the rotation jet 732. On its travel around the outer edge of the cam ring 714, disc 724 and its associated sleeve 722 hold aperture 734 in alignment with rotation jet 732 until the drive jet 718 finds the plane of the wheel alignment. During the course of this 180° movement of the rotatable assembly, the jet 732 is intermittently opened and closed. This enables the usage of a strong jet 732 but slows down the time for the 180° movement so that the time required for it is a few seconds or so. This intermittent operation of jet 732 is accomplished by the vertical fin 726 and a cam surface 738 (FIG. 26) formed in sleeve 722 adjacent aperture 734. As the arm 720 rotates the ambient water pressure moves the fin from the solid line to the dotted line condition of FIG. 26, i.e. due to the degree of oversize between slot 728 and pin 730, to block the jet opening 732. The jet from opening 732 then works against the cam-like surface 738 to drive the sleeve 722 in a clockwise direction (FIG. 26) thereby unblocking the jet 732 and returning the fin 726 to a vertical position. Such repetitive blocking and unblocking of jet 732 takes place during the 180° movement of the rotatable assembly.

It will be appreciated that various modifications and ramifications of the foregoing embodiments may be made without departing from the present invention. For example the outer tube may be fixed but made in two vertically spaced sections, the upper section carrying the opposed jet nozzles and the lower section extending, in effect, through the top plate of the carrier into the leaf compartment and terminating in an annular nozzle discharging radially into the leaf compartment, while the rotatable inner tube has a portion between the upper and lower outer tube sections which is exposed and carries a blade of the FIGS. 7–9 type and also carries a rotation arm with jet, as in FIGS. 18–19. Various other combinations of the operating parts of the above-described embodiments will be apparent from the foregoing to those skilled in the art.

What is claimed is:

1. An automatic pool cleaner comprising a wheelsupported carrier, a plurality of concentric tubes extending upwardly from the carrier and comprising an outer tube fixedly attached to the carrier and an inner tube carried for rotation within the outer tube, a plurality of drive jet nozzles directed laterally from the outer tube, a port formed in the inner tube adapted to be selectively moved into and out of communication with the respective drive jet nozzles by rotative movement of the inner tube, a water supply conduit in delivery relation with the inner tube, a nozzle carried by the lower end of the inner tube operable upon the discharge of water therefrom to apply a rotative force to the inner tube, means responsive to a predetermined upper ambient pressure range resulting from movement of the carrier through the pool water to prevent rotation of the inner tube and responsive to a predetermined lower ambient pressure range to permit such rotation of the inner tube and thereby move said port out of communication with one of said drive jet nozzles and into communication with another one of said drive jet nozzles, thereby effecting a change in the direction of movement of said carrier and generally re-establishing said predetermined upper ambient pressure range to act through said means and prevent further rotation of the inner tube.

2. The cleaner of claim 1, said nozzle having an annular pattern of off-center outlets operable to discharge water into a leaf and debris storage compartment defined in said carrier and thereby induce a suction flow of pool water beneath said carrier inwardly to an annular inlet for said compartment, said suction flow being effective to remove dirt from the pool wall surfaces contacted thereby.

3. The cleaner of claim 1, said nozzle having an annular pattern of off-center outlets operable to discharge water outwardly beneath said carrier to remove dirt from the pool wall surfaces contacted thereby.

4. An automatic pool cleaner comprising a wheel-supported carrier, a water supply conduit, tube means mounted on the carrier for receiving water from said conduit, drive jet nozzle means associated with said tube means to receive water from the latter and drive said carrier, means for controlling the direction of flow of water from said nozzle means to thereby control the direction of movement of said carrier, and means responsive to the ambient pressure condition of said pool water to control said means for controlling the direction of flow of water from said nozzle means.

5. An automatic pool cleaner comprising a wheel-supported carrier, a water supply conduit, a plurality of nozzle means carried by said carrier in communication with said conduit and selectively operable by the unblocking of one and the blocking of another of said nozzle means to drive said carrier in a plurality of different directions, means responsive to deceleration in the movement of said carrier in a given direction to block one nozzle means and to unblock another nozzle means to drive said carrier in a different direction, and means to continue driving said carrier in said different direction until its movement therealong is decelerated.

6. An automatic pool cleaner comprising a wheel-supported carrier, a water supply conduit, drive nozzle means carried by said carrier, means to connect and disconnect said nozzle means with respect to said conduit, said latter means including means responsive to deceleration in the movement of said carrier to disconnect said nozzle means from said conduit.

7. An automatic pool cleaner comprising a wheel-supported carrier, a water supply conduit, drive nozzle means rotatably carried by said carrier to selectively direct the movement of said carrier by the selective connection thereof to said conduit, and means responsive to deceleration in the movement of said carrier to rotate said nozzle means to a selected new position.

8. The cleaner of claim 7, including means responsive to the rotation of said nozzle means to said selected new position and to ambient pressure resulting from consequent movement of said carrier to lock said nozzle means in said new position.

9. An automatic pool cleaner comprising a wheel-supported carrier, a water supply conduit, a plurality of jet drive nozzle means carried by said carrier, control means for said drive nozzle means to cause said carrier to be impelled selectively in a plurality of directions by the selective connection of said drive nozzle means to said conduit, said control means including means responsive to deceleration in the movement of said carrier.

10. An automatic pool cleaner comprising a wheel-supported carrier, a pair of jet drive nozzles operative to drive said carrier in different directions by the selective connection and disconnection thereof with respect to a source of water under pressure, first means operative to disconnect one of said nozzles and to connect the other with respect to said source, and second means responsive to deceleration in the movement of said carrier to operate said first means.

11. An automatic pool cleaner comprising a carrier adapted to travel along a submerged surface of a pool, a pair of jet drive nozzles each operative to drive said carrier in a different direction, a source of water under pressure, first means operative to connect one of said nozzles to said source and disconnect the other therefrom, and second means including means connected to said source to operate said first means.

12. An automatic pool cleaner comprising a carrier adapted to travel along a submerged surface of a pool, a jet drive nozzle operative to drive said carrier in a given direction, a source of water under pressure, first means operative to connect and disconnect said nozzle with respect to said source, second means including means connected to said source to operate said first means, and carrier drive means operative a predetermined time after the operation of said first means by said second means and the consequent disconnection of said nozzle with said source to drive said carrier in another direction.

13. An automatic pool cleaner comprising a carrier adapted to travel along a submerged surface of a pool, a pair of jet drive nozzles each operative to drive said carrier in a different direction, a source of water under pressure, first means operative to connect one of said nozzles to said source and disconnect the other therefrom, second means comprising a rotatable jet nozzle continuously connected to said source to operate said first means, and third means responsive to a drop in ambient pressure applied thereto to condition said second means to operate said first means.

14. An automatic pool cleaner comprising a wheel-supported carrier, a tube carried by said carrier having an upper end disposed above said carrier and a lower end disposed adjacent the bottom of said carrier, a water supply conduit connected to the upper end of said tube, a jet drive nozzle connected to said tube above said carrier and operable to receive water from said conduit and drive said carrier, and means associated with said tube to so direct water issuing from the lower end of said tube as to effect a cleaning of the adjacent pool surface, said means comprising a nozzle to direct water substantially parallel to said pool surface and outwardly circumferentially of said tube.

15. The cleaner of claim 14, said means comprising deflector means to direct the issuing water upwardly and outwardly to induce a radially inward annular flow of water beneath said carrier.

16. The cleaner of claim 15, further including means defining with said carrier a compartment to receive leaves and debris which are induced to travel beneath said carrier by said inward flow and are thereafter entrained in said upwardly and outwardly directed water, the latter being directed into said compartment.

17. The cleaner of claim 14, further including means defining with said carrier a compartment to receive leaves and debris which are induced to travel beneath said carrier by the water issuing from said last-mentioned nozzle, said latter water being directed into said compartment.

18. An automatic pool cleaner comprising a wheel-supported carrier, a water supply conduit, tube means mounted on the carrier for receiving water from said conduit, drive nozzle means rotatably carried by said tube means and in communication with said conduit to drive said carrier and direct the movement thereof back and forth in generally opposite directions, first control means responsive to travel of said carrier at a normal rate in one direction to maintain the positional attitude of said nozzle means, and second control means responsive to travel of said carrier at a lessened or decreasing rate in said one direction to re-position said nozzle means and drive said carrier in the other direction.

19. The cleaner of claim 18, said first control means comprising an annular support member for said nozzle means, a generally horizontally directed tube carried by said support member, a generally vertically directed blade slidably disposed on said tube for inward and outward positioning thereon, and interengaging complemental means associated with said blade and said tube means, operable when said blade is inwardly positioned on said tube in response to ambient water pressure on said blade during travel of said carrier at a normal rate, to lock said nozzle means against rotation.

20. The cleaner of claim 19, said second control means comprising first water-jet discharging means in communication with said supply conduit operable to drive said blade outwardly on said tube, in response to a decrease in said ambient water pressure upon travel of said carrier at a lower rate, to unlock said nozzle means for rotation, and second water-jet discharging means operable when said blade is outwardly positioned on said tube to rotate said nozzle means to drive said carrier in the other direction.

* * * * *